(12) United States Patent
Chandra et al.

(10) Patent No.: US 9,230,270 B2
(45) Date of Patent: Jan. 5, 2016

(54) METHOD AND SYSTEM FOR DISPLAYING A CACHED WEB PAGE ADVERTISEMENT AFTER THE COMPLETION OF A BROWSING SESSION

(75) Inventors: Praphul Chandra, Karnataka (IN); Geetha Manjunath, Karnataka (IN); Nidhi Mathur, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 485 days.

(21) Appl. No.: 12/954,849

(22) Filed: Nov. 27, 2010

(65) Prior Publication Data

US 2012/0072813 A1 Mar. 22, 2012

(30) Foreign Application Priority Data

Sep. 17, 2010 (IN) .......................... 2734/CHE/2010

(51) Int. Cl.
*G06F 17/00* (2006.01)
*G06Q 30/02* (2012.01)
*G06F 12/08* (2006.01)
*G06F 17/22* (2006.01)

(52) U.S. Cl.
CPC ........ *G06Q 30/0277* (2013.01); *G06F 12/0888* (2013.01); *G06F 17/2247* (2013.01)

(58) Field of Classification Search
CPC ............ G06F 12/0888; G06F 17/2247; G06Q 30/0277

USPC ......................................................... 715/200
See application file for complete search history.

(56) References Cited

U.S. PATENT DOCUMENTS

| | | | | |
|---|---|---|---|---|
| 6,009,410 | A * | 12/1999 | LeMole et al. .............. | 705/14.54 |
| 6,011,537 | A * | 1/2000 | Slotznick ....................... | 715/733 |
| 7,155,663 | B2 * | 12/2006 | Landsman et al. ............ | 715/200 |
| 7,975,310 | B2 * | 7/2011 | Hydrie et al. .................. | 726/27 |
| 8,209,344 | B2 * | 6/2012 | Ramer et al. .................. | 707/758 |
| 2002/0023002 | A1 * | 2/2002 | Staehelin ........................ | 705/14 |
| 2007/0088801 | A1 * | 4/2007 | Levkovitz et al. ............ | 709/217 |
| 2007/0255617 | A1 * | 11/2007 | Maurone et al. .............. | 705/14 |
| 2007/0294773 | A1 * | 12/2007 | Hydrie et al. ................. | 726/27 |
| 2008/0086368 | A1 * | 4/2008 | Bauman et al. ................ | 705/14 |
| 2008/0133340 | A1 * | 6/2008 | Do et al. ........................ | 705/14 |
| 2008/0147671 | A1 * | 6/2008 | Simon et al. .................. | 707/10 |
| 2008/0215429 | A1 * | 9/2008 | Ramer et al. .................. | 705/14 |
| 2008/0306817 | A1 * | 12/2008 | Amidon et al. ................ | 705/14 |
| 2009/0083225 | A1 * | 3/2009 | Jacobs et al. .................... | 707/3 |
| 2010/0114714 | A1 * | 5/2010 | Vitek .......................... | 705/14.69 |
| 2010/0138302 | A1 * | 6/2010 | Park et al. .................... | 705/14.58 |
| 2011/0167486 | A1 * | 7/2011 | Ayloo et al. ..................... | 726/7 |
| 2011/0258049 | A1 * | 10/2011 | Ramer et al. ............... | 705/14.66 |
| 2012/0005686 | A1 * | 1/2012 | Rajan et al. ................... | 718/105 |

* cited by examiner

*Primary Examiner* — Cesar Paula
*Assistant Examiner* — Mohammed-Ibrahim Zuberi
(74) *Attorney, Agent, or Firm* — Mannava & Kang, P.C.

(57) ABSTRACT

Presented is a method of displaying a web page advertisement on a computing device. A web page advertisement is segregated from content on the web page during a web browsing session. The web page advertisement is then cached on the computing device for display at a time later to the web browsing session.

13 Claims, 3 Drawing Sheets

112 segregate web advertisement from content on a web page during a web browsing session 114 cache web advertisement 116 display web advertisement at a time later to web browsing session

METHOD AND SYSTEM FOR DISPLAYING A CACHED WEB PAGE ADVERTISEMENT AFTER THE COMPLETION OF A BROWSING SESSION

RELATED APPLICATION

Benefit is claimed under 35 U.S.C. 119(a)-(d) to Foreign application Serial No. 2734/CHE/2010, filed in INDIA entitled "METHOD AND SYSTEM FOR DISPLAYING A WEB PAGE ADVERTISEMENT" by Hewlett-Packard Development Company, L.P., filed on Sep. 17, 2010, which is herein incorporated in its entirety by reference for all purposes.

BACKGROUND

Enterprises are always competing with each other to sell their products and services. Advertisements play a key role in a company's efforts to reach out to its present or potential customers. With growing popularity of the internet among the people and especially the younger generation, marketers have been quick to realize the potential of the Web to advertise the offerings of their firms or clients. As a result, it has become quite common for a web page to carry an advertisement these days, and web sites monetize this opportunity by charging their advertisers.

The idea of a web site having an advertisement although beneficial for a company may not always be favorable from the perspective of a user, who might be more interested in the information on a web page. Large advertisement file sizes, such as those employing animation and other graphic programs, along with low bandwidth speed may impact a user's experience with the Web. The problem could be further compounded in a mobile environment. Thus, apart from having an unpleasant web experience, it may also lead to a user having a negative impression related to the company or product in the advertisement.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

As mentioned above, the Web is being increasingly preferred by enterprises for advertisements related to their products and services. In fact, the Web is becoming as much a synonym for advertisements as for information. However, the increased number of advertisements has some times negatively impacted a user's experience with the Web. It's not uncommon to find a user getting unhappy over increased time required to view or download a web page because of an associated advertisement. The problem gets more apparent when a mobile device is used to access the internet. Since the display screen on a mobile device is limited, an advertisement competes with content for screen space, thus impacting user experience. It would be ideal if a mechanism balances an advertiser's need to grab eye balls and a user's need to obtain information sans the advertisements.

Embodiments of the present solution provide a method and system for displaying a web page advertisement on a computing device. The proposed embodiments decouples a web page access time from the advertisement display time.

For the sake of clarity, it may be mentioned that the terms "web site" and "web page" are used interchangeably through out this document. Further, the phrase "web browsing session" refers to a web browsing period during which a user may access one or more web pages (web sites) on a computer network, such as the Internet or an intranet. A user may use a web browser or a widget for web browsing. Also, the term "web" refers to the World Wide Web.

Figure 1:
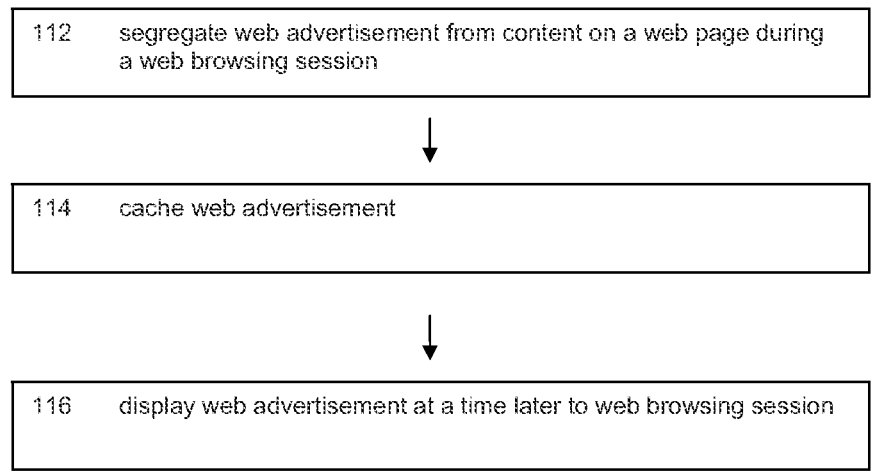
FIG. 1 shows a flow chart of a method of displaying a web page advertisement on a computing device according to an embodiment.

FIG. 1 shows a flow chart of a method of displaying a web page advertisement according to an embodiment.

Step 112 involves segregating a web page advertisement(s) from content on a web page during a web browsing session. In a typical scenario, a user tries to access a web site by providing the web site's URL (Uniform Resource Locator) in the address bar of a web browser (such as, Microsoft Internet Explorer, Mozilla Firefox, etc.) on his or her computing device. Upon receiving the URL, the web browser accesses the web site (on a web server) and retrieves its content for display to the user. In case the web page carries an advertisement, the advertisement is also displayed in the web browser along with the content. However, in an embodiment of the present disclosure, the method step 112 separates a web page advertisement(s) from the web page content during a web browsing session. Since the web advertisement(s) are removed, only the web page content is presented to a user during a web session. To illustrate, let's assume that a user is viewing a web page on a car that has been recently released into a market. In this case, there is a possibility that the web page, which a user is viewing, might offer advertisements related to the new car, such as, advertisement(s) related to dealers selling the car, manufacturers offering accessories related to the car, financiers providing a loan on the car, etc. In this case, the method step 112 would segregate such advertisements on the web page and present only the content (related to the new car) to a user for viewing.

Step 112 may be performed by a browser (for example, by using a plug-in) or it may form a part of a widget. A widget is a software component that encompasses a series of steps required to perform a web interaction. In an embodiment, method step 112 may comprise one of the widget's steps.

Step 114 involves caching a web page advertisement or a plurality of web advertisements, as the case may be, which were segregated in step 112. In an embodiment, the web advertisement(s) may be stored in a local repository, such as the computing device of a user. For example, the web advertisement(s) may be stored in a database residing in a memory (such as, hard disk) of the computing device. In another embodiment, the web advertisement(s) may be stored in a foreign repository (such as, another computer device), which is connected to a user's computing device by wired or wireless network means, such as the Internet or an intranet. For example, the web advertisement(s) may be stored on a web server connected to a user's computing device.

In an embodiment, each time a user accesses a web site having an advertisement(s), the method steps (112 and 114) segregates the advertisement(s) and updates them in a repository.

Step 116 involves displaying a web advertisement or a plurality of web advertisements at a time later to the web browsing session. Once a web browsing session of a user is complete, the web advertisement(s) stored during step 114 are displayed or offered for display to the user at a time subsequent to the web browsing session. The web advertisement(s) may be displayed to a user at a later time based on meeting of a pre-defined condition or a set of conditions.

In an embodiment, the pre-condition may be based on a context specified in the advertisement. A web advertiser may want an advertisement to be displayed only during certain circumstances or situations. In such case, the web advertiser could add or embed context specific information in the advertisement file. To illustrate with the help of the "car" example mentioned above, if a dealer of the new car would like his or her advertisement displayed to a user only after office hours, on the assumption that a user is likely to have more free time at that moment and would probably view his or her advertisement more favorably compared to its display during office hours, the dealer (or his web advertiser) may add a condition along with the advertisement file specifying that the advertisement is to be displayed only after, say, 8:00 PM local time in the user's device. Once such pre-condition has been specified, the embodiment would display the advertisement only after 8:00 PM.

To provide another illustration, an advertisement for an eatery or restaurant may include context information that the advertisement is to be displayed on a user's computing device only during local dining intervals, such as from 12:00 PM to 2:00 PM. In such case, the advertisement would be displayed only between 12:00 PM and 2:00 PM.

In a further embodiment, a user's context is continuously or regularly monitored both at the user's device level and, by an advertiser, if the user is connected to the Web. The web advertisement is displayed based on user's current context. To illustrate, a web advertisement cached previously may be displayed depending upon the location of a user. If the user is at a work location, for example, a school or an office, the advertisement may not be displayed at all. However, if the user is in a mall, the advertisement would be displayed.

In a yet another embodiment, an advertisement(s) may be displayed based on a user's settings or preferences. A suitable browser plug-in or a widget may be used to obtain a user's pre-condition(s) regarding when an advertisement is to be displayed. For example, in the "car" scenario mentioned above, instead of the advertiser, a user of a computing device may specify when an advertisement cached during an earlier web browsing session is to be displayed. Therefore, a user may specify that an advertisement may be displayed after 8:00 PM local time. To provide another illustration, a user may specify that any advertisements cached on his mobile device may only be displayed on his or her personal computer (PC) as and when the user connects to the PC using his mobile. To provide a further illustration, a user may specify that only certain kinds of advertisements are to be displayed on his her computing device. For example, if a user is a gadget enthusiast, the user may specify the type of gadgets he is interested in (mobiles, plasma TV, camcorders, etc.). The embodiment would display only related advertisements accordingly.

In an embodiment, if there's a conflict between the pre-condition (or context) specified in the web advertisement and a user's preference, the user may have an option to override the pre-condition specified in the advertisement.

In another embodiment, a user may specify the amount of attention (in unit times) he or she is willing to pay to obtain information from a web site. The units may be specified through a suitable interface, such as, a browser plug-in or a widget, on a user's computing device. Once specified, the units may be auctioned amongst web sites (or web advertisers) providing the information a user might be looking for. To illustrate, let's assume a user specifies that he or she is willing to spend 60 seconds viewing a web advertisement(s) in lieu of the information he or she is looking for. In such case, the embodiment would auction the units (60 seconds) amongst the web sites (who have the information), either during or prior to a web browsing session, to find out which of the web site(s) is/are willing to share information with the user for the units available. The web site(s) who win the auction is/are allowed to provide information to the user and the web advertisements(s) on the web site(s) are stored on the user's computing device for subsequent display per the units won by the web site(s).

In the embodiments mentioned, the display of an advertisement(s) does not take place during a web browsing session. It is occurs only after a session is over or complete.

The method steps described above may not necessarily be performed in the sequence as outlined above. The steps may be performed in any other sequence as well, with a step(s) being performed prior or later to other method steps.

Figure 2:
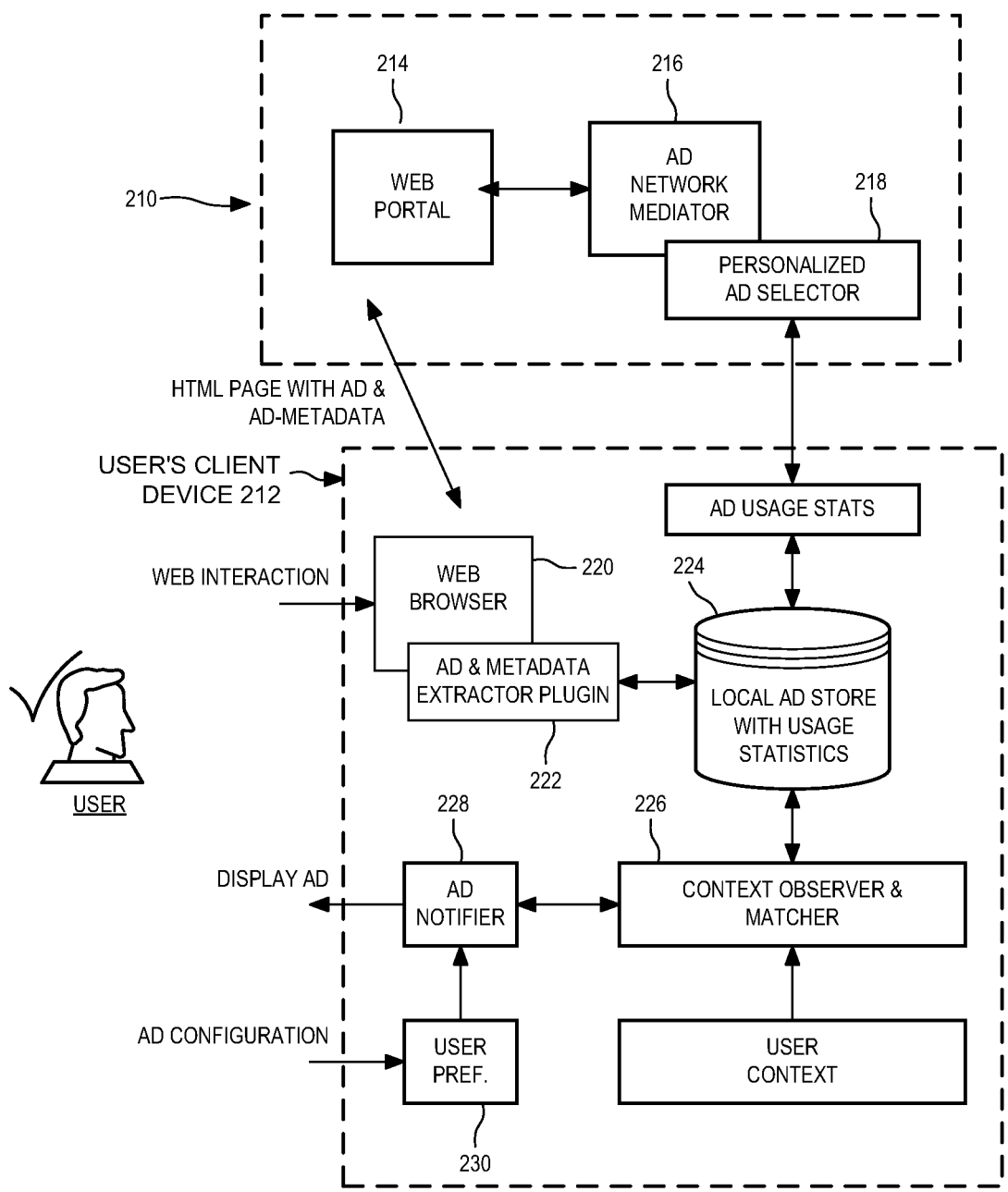
FIG. 2 shows a diagram of a system illustrating a representative environment in which the embodiments of the system operate according to an embodiment.

FIG. 2 shows a diagram of a system illustrating a representative environment in which the embodiments of the system operate according to an embodiment.

The system includes a server computer 210 and a computing system or device 212. The system components may be connected with each other via a network, such as, the internet or an intranet, through wired or wireless means.

Server computer 210 is a computer that provides services used by other computers. In an embodiment, the server computer is a web server that delivers content, such as web pages, using the Hypertext Transfer Protocol (HTTP), over the World Wide Web (the web). In the present environment, the web server serves as a link between the computing device and the web. It transfers content (web pages) from the web to the computer device. The representative environment envisages a server computer hosting at least one web site (web portal) 214 for display on the computing device upon establishment of a connection between the two. The at least web site on the server computer may contain at least one web advertisement for display on the computing device upon completion of a web browsing session between the server computer and the computing device. The at least one web advertisement may be displayed on the computing device upon meeting of a pre-defined condition or a set of conditions.

Apart from hosting at least one web site (web portal), the server computer may include an advertisement network mediator module 216 and a personalized advertisement selector module 218, according to an embodiment. Both these modules may be software components or programs having machine readable instructions readable by a processor.

Computing device 212 may be any kind of electronic device, such as, but not limited to, a personal computer, a desktop computer, a laptop computer, a notebook computer, a network computer, a personal digital assistant (PDA), a mobile device, a hand-held device, or any other suitable computing device. The computing device may be a standalone system or a network system connected to other computing devices through wired or wireless means. In the representative environment, the computing device would be a user's device i.e. it may be used by a user for connecting to the server computer. In an embodiment, the computing device may include a web browser 220 (such as Microsoft Internet Explorer, Mozilla Firefox, etc.) or a widget for accessing a web site on a web server (such as server computer), an advertisement and metadata extractor plug-in 222 for the web browser, a repository 224 (for storing web advertisement(s) and advertisement usage statistics), a context observer and matcher module 226, an advertisement notifier module 228 and a user interface 230 for obtaining a user's preferences. The modules mentioned herein may be software components or programs having machine readable instructions readable by a processor. Further, the computing device also includes a display unit for displaying a web site and a web page advertisement.

In an embodiment, a user accesses a web site by providing the web site's URL (Uniform Resource Locator) in the address bar of the web browser on his or her computing device. Upon receiving the URL, the web browser accesses the web site on the web server and retrieves its content for display to the user. In case the web site carries a web advertisement(s), the advertisement(s) is segregated from the web site content during the web browsing session and stored on the computing device for display at a time later to the web browsing session.

In another embodiment, the advertisement network mediator module 216 is responsible for selecting a web advertisement(s) which is to be displayed on a web site (web portal). The personalized advertisement module 218 obtains advertisement usage statistics (stored in a repository) from a user's device. Based on usage statistics, it works in conjunction with the advertisement network mediator to select personalized advertisement(s) for display to a user. The advertisement network mediator may also add metadata along with the selected advertisement, specifying context as to when an advertisement is to be displayed on a user's device. In one implementation, web sites may embed advertisements on their pages with the following information: a) start and end of an advertisement, b) context in which an advertisement is to be displayed and c) mapping of DOM (Document Object Model) elements to advertisements (optional). The optional mapping of different DOM elements to advertisements can be helpful for information accessing widgets which retrieve and display only some part of the page. For such widgets, the specified mapping information can be used for choosing which advertisement to store and display.

In a further embodiment, an advertisement(s) may be displayed based on a user's settings or preferences. A user interface 230 is used for obtaining a user's preferences, which are forwarded to an advertisement notifier 228. The advertisement notifier 228 interacts with the context observer and matcher module 226 to identify an advertisement matching with the user's preference(s) and displays it on the user's device. In another embodiment, the context observer and matcher module continuously or periodically monitors a user's context 232 (for example, a user's location, such as whether in an office complex or in a mall), finds an advertisement(s) matching a user's context from an advertisement repository (local or remote) and displays it on the user's device.

In case a web browser is used on a user's device for a web browsing session, an advertisement and metadata extractor plug-in 222 for the web browser may be used to store and extract an advertisement(s) and associated metadata in a repository 224. The repository may also store details related to usage statistics of an advertisement(s). In another scenario, a widget on a user's device may be used for a web browsing session.

Figure 3:
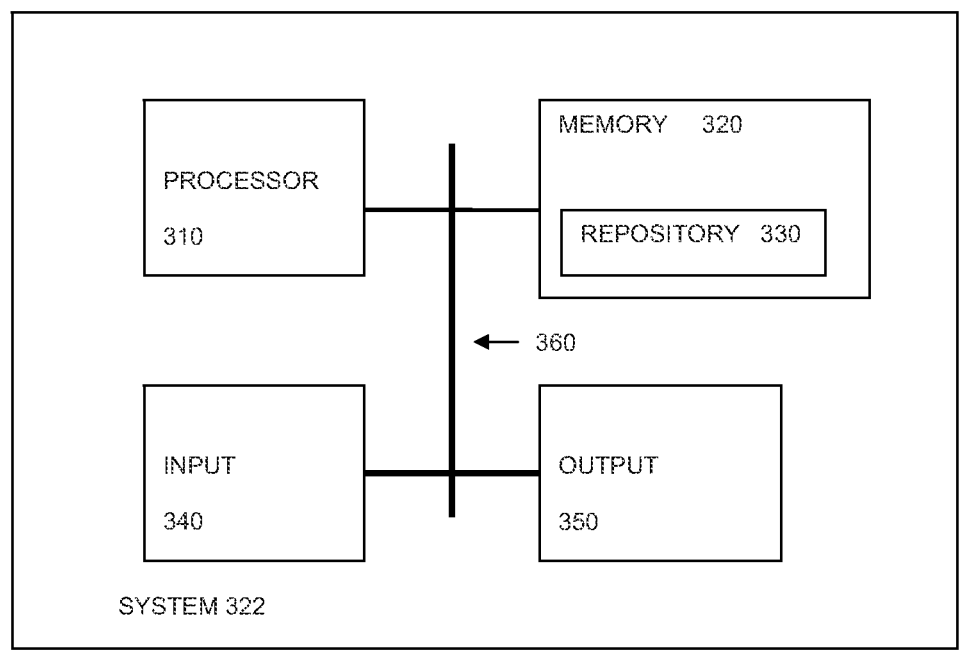
FIG. 3 shows a block diagram of a computer system according to an embodiment.

FIG. 3 illustrates a block diagram of a computing device 322 according to an embodiment.

The device 322 may include a processor 310, for executing computer executable instructions, a memory 320, an input device 340 and an output device 330. These components may be coupled together through a system bus 360.

The processor 310 is configured to execute machine readable instructions to segregate the web page advertisement from content on a web page during a web browsing session. The pre-condition may be a context defined by a provider of the web advertisement and/or a context defined by a user of the computing device.

The memory 320 may include computer system memory such as, but not limited to, SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc. The memory 320 may be used to cache at least one web page advertisement in a repository 330.

The input device 340 may include a mouse, a key pad, a touch pad or screen, a voice recognizer, and the like. The output device or a display system 350 may include a Virtual Display Unit (VDU), a printer, a scanner, and the like. The display system may be used to display a web advertisement at a time later to a web browsing session.

It would be appreciated that the system components depicted in FIGS. 2 and 3 are for the purpose of illustration only and the actual components may vary depending on the computing system and architecture deployed for implementation of the present solution. The various components described above may be hosted on a single computing system (or device) or multiple computer systems (or devices) connected together through suitable means.

The embodiments described provide a mechanism that decouples a web page access time from an advertisement display time. This can lead to improved user experience by (a) enabling users to access clutter-free advertisement information when they need it and (b) by automatically displaying contextually relevant advertisements to a user at the right moment. The embodiments also help an advertisement provider by enabling better targeting of the advertisement to a user's task.

It will be appreciated that the embodiments within the scope of the present solution may be implemented in the form of a computer program product including computer-executable instructions, such as program code, which may be run on any suitable computing environment in conjunction with a suitable operating system, such as, Microsoft Windows, Linux or UNIX operating system. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present solution is for the purpose of illustration only. Although the solution has been described in conjunction with a specific embodiment thereof, those skilled in the art will appreciate that numerous modifications are possible without materially departing from the teachings and advantages of the subject matter described herein. Other substitutions, modifications and changes may be made without departing from the spirit of the present solution.

The invention claimed is:

1. A method of displaying a web page advertisement on a computing device, comprising:

receiving, from a web server, a web page including content and the web page advertisement;

segregating, by a web browser of the computing device, the web page advertisement from the content of the web page during a web browsing session, wherein the segregating comprises removing the web page advertisement from the content of the web page;

presenting the content of the web page without the web page advertisement to a user of the computing device during the web browsing session;

caching the web page advertisement;

determining whether the web browsing session is completed;

in response to determining the web browsing session is completed, determining whether a pre-defined condition other than determining the web browsing session is completed is met, wherein the pre-defined condition includes a pre-defined amount of time representing a user's willingness to view a web advertisement for the pre-defined amount of time, in lieu of viewing content on a web page, and wherein the pre-defined amount of time is auctioned amongst a plurality of web sites during or prior to the web browsing session; and in response to determining the web browsing session is completed and determining that the pre-defined condition is met, displaying the web advertisement at a time after the web browsing session is completed.

2. A method according to claim 1, wherein the pre-defined condition specifies a time of day to display the web advertisement.

3. A method according to claim 2, wherein the pre-defined condition includes a context defined by a provider of the web advertisement.

4. A method according to claim 2, wherein the time of day to display the web advertisement is defined by a user of the computing device.

5. A method according to claim 2, wherein the pre-defined condition includes a preference defined by the user of the computing device.

6. A method according to claim 2, wherein the pre-defined condition is continuously or regularly monitored by a provider of the web advertisement.

7. A method according to claim 1, wherein the web advertisement is cached on a computing device used for the web browsing session or another computing device.

8. A method according to claim 1, wherein the web advertisement is displayed on the computing device used for the web browsing session or another computing device.

9. A method according to claim 1, wherein the method steps are embodied in a widget.

10. A computing device for displaying a web page advertisement, comprising:
a processor to execute machine readable instructions to receive, from a web server, a web page including content and the web page advertisement, segregate the web page advertisement from the content of the web page during a web browsing session, present the content of the web page without the web page advertisement to a user of the computing device during the web browsing session;
a memory to cache the web page advertisement, and
a display system to display the web advertisement at a time after the web browsing session, wherein the processor is to
determine whether the web browsing session is completed,
in response to determining the web browsing session is completed, determine whether a pre-defined condition other than determining the web browsing session is completed is met, wherein the pre-defined condition includes a pre-defined amount of time representing a user's willingness to view a web advertisement for the pre-defined amount of time, in lieu of viewing content on a web page, and wherein the pre-defined amount of time is auctioned amongst a plurality of web sites during or prior to the web browsing session, and
in response to determining the web browsing session is completed and determining the pre-defined condition is met, display the web advertisement via the display system.

11. A computing device according to claim 10, wherein the web advertisement is displayed based upon meeting of the pre-defined condition.

12. A computing device according to claim 10, wherein the computing device is a mobile device.

13. A non-transitory computer readable medium storing machine readable instructions that when executed by at least one processor are to:
receive, from a web server, a web page including content and a web page advertisement;
segregate the web page advertisement from the content of the web page during a web browsing session, wherein the segregating comprises removing the web page advertisement from the content of the web page;
present the content of the web page without the web page advertisement to a user during the web browsing session;
cache the web page advertisement;
determine whether the web browsing session is completed;
in response to determining the web browsing session is completed, determining whether a pre-defined condition other than determining the web browsing session is completed is met, wherein the pre-defined condition includes a pre-defined amount of time representing a user's willingness to view a web advertisement for the pre-defined amount of time, in lieu of viewing content on a web page, and wherein the pre-defined amount of time is auctioned amongst a plurality of web sites during or prior to the web browsing session; and
in response to determining the web browsing session is completed and determining the pre-defined condition is met, display the web advertisement at a time after the web browsing session is completed.

* * * * *